United States Patent [19]

Dunn et al.

[11] Patent Number: 5,100,846

[45] Date of Patent: Mar. 31, 1992

[54] PURIFICATION OF CARBOTHERMALLY PRODUCED ALUMINUM NITRIDE

[75] Inventors: David A. Dunn; James A. Hughes, both of Midland; Joyce A. Broka, Bay City; Michael S. Paquette, Midland, all of Mich.

[73] Assignee: The Dow Chemical Company, Midland, Mich.

[21] Appl. No.: 582,285

[22] Filed: Sep. 13, 1990

[51] Int. Cl.⁵ .............................................. C04B 35/58
[52] U.S. Cl. ..................................... 501/96; 501/98; 423/412
[58] Field of Search ..................... 501/98, 96; 423/412

[56] References Cited

U.S. PATENT DOCUMENTS

| | | | |
|---|---|---|---|
| 1,274,797 | 8/1918 | Shoeld . | |
| 2,962,359 | 11/1960 | Perieres et al. | 23/192 |
| 3,032,398 | 5/1962 | Clair | 23/192 |
| 3,238,018 | 3/1966 | Winter et al. | 23/192 |
| 3,436,179 | 4/1969 | Matsuo et al. | 23/192 |
| 4,499,193 | 2/1985 | Phelps et al. | 501/98 |
| 4,618,592 | 10/1986 | Kuramoto et al. | 501/98 X |
| 4,680,278 | 7/1987 | Inoue et al. | 501/98 |
| 4,764,321 | 8/1988 | Huseby et al. | 501/98 X |
| 4,766,097 | 8/1988 | Shinozaki et al. | 501/98 |
| 4,778,778 | 10/1988 | Mallia et al. | 423/290 |
| 4,784,839 | 11/1988 | Bachelard et al. | 423/290 |
| 4,877,259 | 10/1989 | Holt et al. | 501/97 X |
| 4,977,113 | 12/1990 | Plelps | 501/98 |
| 4,983,553 | 1/1991 | Dunn et al. | 501/96 |

FOREIGN PATENT DOCUMENTS

| | | | |
|---|---|---|---|
| 0077111 | 5/1985 | Japan | 423/412 |
| 2278110 | 12/1987 | Japan | 501/96 |

*Primary Examiner*—Karl Group

[57] ABSTRACT

A method is disclosed for purifying aluminum nitride produced by carbothermal reaction of aluminum oxide, carbon and nitrogen. Precursor pellets including aluminum oxide and carbon are exposed to nitrogen under conditions sufficient to carbothermally produce aluminum oxide, thereby producing aluminum nitride pellets having surface portions relatively rich in thermal conductivity-lowering and color-causing impurities compared to core portions of the aluminum nitride pellets. Significant amounts of the surface portions are thereafter removed to thereby significantly increase the purity of the aluminum nitride pellets.

7 Claims, No Drawings

PURIFICATION OF CARBOTHERMALLY PRODUCED ALUMINUM NITRIDE

BACKGROUND OF THE INVENTION

High thermal conductivity aluminum nitride (AlN) is suitable for many applications, such as packaging components for electronic circuitry. However, carbothermally produced aluminum nitride often contains impurities such as silicon, calcium, chromium, and iron, which are believed to cause color variability and lower thermal conductivity of the sintered aluminum nitride.

Kuramoto, et al., *Ygoyo Kyokai Shi*, 93(9): 517-22 (1985), disclose low metals impurities for achieving high thermal condutivities in aluminum nitride. U.S. Pat. No 4,618,592, issued to Kuramoto, et al., also disclose concentrations of metals for high thermal conductivity aluminum nitride. Low metals contamination in aluminum nitride is also important for obtaining a consistent color in final aluminum nitride sintered parts. Skeele, et al., "Evaluation of Properties/Performance Relationships for Aluminum Nitride," *Proc. 3rd Int'l Conf. Ceramic Powder Processing Sci.* (1990), disclose the effect of trace metals on the color of sintered aluminum nitride parts. It is generally accepted that contamination by metals causes color variation and limits thermal conductivity in aluminum nitride.

Typically, methods of carbothermally producing aluminum nitride either do not provide for removal of these impurities or require additional processing steps which can significantly diminish the yield of the carbothermal reaction. In one method of producing aluminum nitride, disclosed in U.S. Pat. No. 2,962,359, carbothermal reaction to form aluminum nitride is performed at a temperature in a range of between about 1650° C. and about 1750° C. to diminish formation of AlCN. Reaction between aluminum oxide and carbon is thereby more complete. However, only carbon, aluminum oxide and AlCN are reduced by this process. The presence of trace impurities, such as silicon, calcium, chromium and iron, are not diminished by conversion of aluminum oxide to aluminum nitride followed by oxidation for the removal of excess carbon.

Another method of producing aluminum nitride by carbothermal reaction, disclosed in U.S. Pat. No. 3,032,398, includes pelletizing finely comminuted aluminum oxide and carbon with a binder comprising an aluminate of lime such that the pellets are sufficiently porous to permit nitrogen to pass to the center of the pellets. The binder is removed during carbothermal reaction by conducting the pellets through vertical retorts of a reactor, at the top of which is disposed an expansion chamber for removing gross amounts of volatilized impurities, such as calcium, from the binder. However, trace impurities which are not transported away from the pellets during carbothermal reaction remain.

Therefore, a need exists for a new method of producing aluminum nitride by carbothermal reaction which overcomes or minimizes the above-listed problems.

SUMMARY OF THE INVENTION

The present invention relates to a method of purifiying carbothermally produced aluminum nitride and to aluminum nitride pellets produced by a method including purifying carbothermally produced aluminum nitride.

A method of purifying carbothermally produced aluminum nitride includes exposing precursor pellets, comprising aluminum oxide and carbon, to nitrogen under conditions sufficient to carbothermally produce aluminum nitride pellets having surface portions relatively rich in thermal conductivity-lowering and color-causing impurities compared to core portions of the aluminum nitride pellets. Significant amounts of the surface portions are removed to thereby significantly increase the purity of the aluminum nitride contained in the aluminum nitride pellets.

Aluminum nitride pellets are produced by a method which includes exposing precursor pellets, comprising aluminum oxide and carbon, to nitrogen under conditions sufficient to carbothermally produce aluminum nitride pellets having surface portions relatively rich in thermal conductivity-lowering and color-causing impurities compared to core portions of the aluminum nitride pellets. Significant amounts of the surface portions are removed to leave behind aluminum nitride pellets having significantly increased purity.

This invention has many advantages. Aluminum nitride is produced by carbothermal reaction, wherein thermal conductivity-lowering and color-causing impurities are removed. Also, aluminum nitride pellets are purified of thermal conductivity-lowering and color-causing impurities without requiring elaborate furnace modifications or costly chemical post-processing. Also, less expensive raw materials having higher concentrations of impurities can be used to produce aluminum nitride.

DETAILED DESCRIPTION OF THE INVENTION

The features and other details of the invention will now be more particularly described and pointed out in the claims. It will be understood that the particular embodiments of the invention are shown by way of illustration and not as limitations of the invention. The principal features of the invention may be employed in various embodiments without departing from the scope of the invention.

In one embodiment of the present invention, aluminum nitride is produced by a method including carbothermal reaction of precursor pellets. "Precursor pellets," as that term is used herein, means pellets including aluminum oxide ($Al_2O_3$) and carbon (C) suitable for reacting with nitrogen (N) by carbothermal reaction to form aluminum nitride.

It is to be understood that carbothermal reaction comprises reaction of aluminum oxide ($Al_2O_3$), carbon (C) and nitrogen (N) to form aluminum nitride (AlN). The equation for this reaction is shown below:

$$Al_2O_3 + C + N_2 \rightarrow 2AlN + 3CO$$

Aluminum oxide suitable for use comprises an aluminum oxide powder suitable for carbothermal reaction to form aluminum nitride by the method of the present invention. An example of suitable aluminum oxide powder has an average particle size of about 0.5 microns and a specific surface area of about 9.5 $m^2/gm$ ((meters)$^2$/gram).

Carbon suitable for use comprises a carbon powder suitable for carbothermal reaction with the aluminum oxide to form aluminum nitride by the method of the present invention. The carbon powder has a specific surface area, for example, of about sixty $m^2/gm$.

The aluminum oxide and carbon powders are suitably combined for carbothermal reaction. The aluminum oxide and carbon are combined to form a dry mixture including aluminum oxide in an amount in the range of between about sixty percent by weight and about seventy-six percent by weight and including carbon as the remainder of the dry mixture. The aluminum oxide and carbon are combined by a suitable method, such as by milling the aluminum oxide and carbon in a ball mill containing a suitable milling media for a period of time of up to about five hours. An example of a suitable milling media is 0.5 inch (1.27 cm), high density, aluminum oxide milling media, commercially available from Coors Ceramics Company.

The milled dry mixture of aluminum oxide and carbon can then be blended with water and a binder in a ribbon blender to form a wet mixture suitable for forming wet precursor pellets. The ribbon blender has an internal blade which is operated at a rate in the range of between about thirty and about sixty revolutions per minute. Enough binder is added to the dry mixture in the ribbon blender to comprise between about one percent and about twenty percent of the total weight of the wet mixture. A binder is selected which is suitable for maintaining the shape of the precursor pellets during carbothermal reaction to form aluminum nitride pellets. Examples of suitable binders include polyvinyl alcohol, starch, methylcellulose and colloidal alumina. Water is then added to the dry mixture and binder by spraying the water into the blender in an amount sufficient to comprise between about twenty percent and about forty percent of the total weight of the wet mixture.

The wet mixture is then formed into wet precursor pellets. In one embodiment, the precursor pellets have an average diameter in the range of between about 0.3 centimeters and about one centimeter. Suitable precursor pellets can have many different shapes. Examples of suitable shapes of the precursor pellets include cylinders, spheres, tablets, briquettes, agglomerates, extrudates, granulates, etc. In general, it is favorable to produce a shape that minimizes the surface-to-volume ratio and therefore causes higher concentrations of impurities to form in the surface portions.

Suitable methods of forming the wet precursor pellets include, for example, extrusion, granulation, tableting, etc. In one embodiment, the precursor pellets are formed by applying pressure to the wet mixture, thereby extruding the wet mixture through holes in a suitable die plate. The holes can be generally circular, for example, and have an average diameter of about 0.25 inches (0.64 cm). As the wet mixture is extruded through the die plate, a knife blade is passed across the holes to section the wet mixture in lengths of about 0.25 inches (0.64 cm). The sections comprise the wet precursor pellets in the shape of right cylinders.

The wet precursor pellets can also be formed by granulation, wherein the dry mixture of aluminum oxide and carbon powder are suitably combined with a binder and then spread onto an inclined rotating disk. Examples of suitable binders include polyvinyl alcohol, starch, methylcellulose, colloidal alumina, etc. The disc is rotated and water is sprayed onto the mixture of aluminum oxide, carbon and binder. As water accumulates in the mixture, rotation of the disc causes the mixture to agglomerate and form generally spherical and irregularly shaped wet precursor pellets.

Still another method of forming suitable precursor pellets is tableting, which includes filling a die with the dry mixture of aluminum oxide, carbon and binder. The mixture is then compacted with a punch which is mated to the die to thereby form the precursor aluminum oxide tablets. An example of a shape which can be formed by tableting is a spherical shape.

Briquettes, formed by roll compaction, are also a suitable form of the wet precursor pellets. Roll compaction, as that term is used herein, includes feeding a wet mixture, such as that disclosed above, between steel rolls having pockets for receiving the wet mixture. The briquettes are shaped by the pockets.

The wet precursor pellets are exposed to conditions sufficient to reduce water content of the precursor pellets to an amount suitable for carbothermal reaction of the carbon and aluminum oxide contained in the precursor pellets. The wet precursor pellets can be dried, for example, in a forced-air convection oven. The precursor pellets are loaded into trays in the oven to form a bed having a depth in the range of between about one-half inch (1.27 cm) and about two inches (5.08 cm). Preferably, the depth of the bed is about one inch (2.54 cm). In one embodiment, the precursor pellets are dried in the oven at a temperature in the range of between about 110° C. and about 150° C. at atmospheric pressure for a period of time sufficient to reduce the water content of the precursor pellets to less than about two percent by weight. In a preferred embodiment, the period of drying is about nine hours.

The dry precursor pellets are then exposed to nitrogen under conditions sufficient to carbothermally produce aluminum nitride pellets. The carbothermally produced aluminum nitride pellets have surface portions relatively rich in impurities which can limit thermal conductivity and can cause color variation when the aluminum nitride pellets are sintered, as compared to amounts of such impurities in core portions of the aluminum nitride pellets. Carbothermal production of the aluminum nitride pellets can be conducted in a suitable reactor. An example of a suitable reactor is a shelf reactor lined with graphite.

In a preferred embodiment, carbothermal production is conducted in a pusher-type continuous carbothermal reactor of the type described in U.S. Pat. No. 4,983,553, the teachings of which are incorporated herein by reference. The precursor pellets are loaded into perforate-bottom trays of a pusher-type continuous carbothermal reactor to form a bed of precursor pellets having a depth of about one-half inch (1.27 cm). The precursor pellets are exposed to nitrogen by introducing nitrogen gas to the reactor at a suitable rate and under sufficient conditions to cause carbothermal reaction of the nitrogen and the carbon with the aluminum oxide. The nitrogen gas can be directed into the reactor from a cylinder or from some other suitable pressurized source of nitrogen. Carbon monoxide gas produced during the carbothermal reaction is vented from the reactor to allow a continuous flow of nitrogen across the reaction bed. Nitrogen gas is introduced to the reactor at a rate sufficient to limit the concentration of carbon monoxide in the gas vented from the reactor to a level below about thirty percent by volume. The concentration of carbon monoxide present in the gas vented from the reactor can be determined by a suitable means, such as by a non-dispersive infrared analyzer.

One important condition for production of the high thermal conductivity aluminum nitride includes heating the precursor pellets in the presence of nitrogen to an elevated temperature sufficient to carbothermally produce aluminum nitride pellets having surface portions relatively rich in thermal conductivity-lowering impurities compared to core portions of the aluminum nitride pellets. In one embodiment, the trays containing the precursor pellets are directed through the pusher-type furnace at a rate sufficient to cause the precursor pellets to be exposed to an elevated temperature in the range of between about 1500° C. and about 1900° C. for a period of time in the range of between about 0.25 hours and about six hours. In a preferred embodiment, the trays are directed through the furnace at a rate sufficient to cause the pellets to be exposed to an elevated temperature in the range of between about 1650° C. and about 1750° C. for a period of time of about ninety minutes. During carbothermal reaction, the carbon and aluminum oxide of the precursor pellets react to form aluminum nitride pellets.

Although the exact mechanism is not known, it is believed that the surface portions of the carbothermally produced aluminum nitride pellets are relatively rich in thermal conductivity-lowering and color-causing impurities because such impurities present in the pellets migrate and collect at surface portions of the pellets during carbothermal production of the aluminum nitride pellets. Migration of the impurities to the surface portions of the aluminum nitride pellets causes the surface portions to be relatively rich in thermal conductivity-lowering and color-causing impurities compared to core portions of the aluminum nitride pellets.

Thermal conductivity-lowering and color-causing impurities include metals which can cause the thermal conductivity of the carbothermally produced aluminum nitride formed to be less than about 100 W/m°K. Examples of such metals include iron, silicon, calcium, chromium, etc. Examples of sources of these impurities can include the aluminum oxide powder, carbon powder, binder, densification aid and water. Other sources can include milling, blending, granulating and extruding apparatus used to combine the aluminum oxide carbon, binder, densification aid and water to form the precursor pellets.

Following the carbothermal reaction, fines generated during the carbothermal reaction and surface portions of the aluminum nitride pellets which are relatively rich in thermal conductivity-lowering impurities compared to core portions are removed from the aluminum nitride pellets. The surface portions, upon their removal from the aluminum nitride pellets, form additional fines.

In one embodiment, the surface portions can be removed from the aluminum nitride pellets by attrition. Attrition can be achieved by mechanical agitation of the pellets on a screen through which the fines pass. The screen is formed of a material suitable for attrition from the aluminum nitride pellets of surface portions relatively rich in thermal conductivity-lowering and color-causing impurities compared to core portions. Examples of suitable materials include 316L stainless steel, brass and synthetics, such as nylon, etc. Mechanical agitation of the pellets on the screen is achieved by disposing the pellets on the screen and vibrating the screen either manually or by automatic means for a period of time sufficient to remove surface portions of the aluminum nitride pellets which are relatively rich in thermal conductivity-lowering and color-causing impurities compared to core portions of the aluminum nitride pellets. In a preferred embodiment, the pellets are mechanically agitated by feeding the pellets at a rate of about sixty pounds (27.2 Kg) per hour to a sixteen inch vibratory screener. An example of a suitable vibratory screener is a sixteen inch (41 cm) vibratory screener commercially available from Sweco, Inc. Fines generated during handling and fines formed by attrition of surface portions of the aluminum nitride pellets fall through the screen and can be collected under the screen for further processing.

In another embodiment, attrition is achieved by mechanical abrasion between the aluminum nitride pellets. Mechanical abrasion can be achieved by disposing the aluminum nitride pellets in a container and vibrating the container either manually or by automatic means for a period of time sufficient to remove surface portions of the aluminum nitride pellets which are relatively rich in thermal conductivity-lowering and color-causing impurities compared to core portions of the aluminum nitride pellets. Fines formed by attrition of surface portions can be collected at the bottom of the container for further processing.

Either before or after removing the surface portions, the aluminum nitride pellets can be exposed to conditions sufficient to remove residual unreacted carbon, such as by maintaining the aluminum nitride pellets in an oxidizing atmosphere at a temperature in the range of between about 700° C. and about 800° C. for a period of time in the range between about 0.5 hours and about three hours. An example of a suitable reactor for removal of residual carbon from the aluminum nitride pellets is a rotary kiln reactor.

The aluminum nitride pellets remaining after attrition of impurities and removal of residual carbon are comprised of higher purity aluminum nitride than prior to removal of impurities.

The invention will now be further and more specifically described by the following examples. All parts and percentages are by weight unless otherwise stated.

EXAMPLE I E

A first batch of dry mixture was formed by mixing seventy pounds (31.8 Kg) of aluminum oxide, commercially available from Aluminum Company of America under the trade designation of Alcoa A16-SG with twenty-five pounds (11.4 Kg) of acetylene carbo black, commercially available from Chevron Chemical Company under the trade designation of Shawinigan acetylene black. The aluminum oxide had a specific surface area of about nine $m^2/gm$ and an average particle size of about 0.5 microns. The acetylene carbon black had a specific surface area of about sixty $m^2/gm$. The mixture was charged to an eighty gallon (303 1) ball mill, containing 0.5 inch (1.27 cm) high-density (about 99.5% dense) aluminum oxide milling media, commercially available from Coors Ceramics Company. The mixture was dry-milled for about four hours. The procedure was repeated employing an additional seventy pounds (32 Kg) of aluminum oxide and twenty-five pounds (11 Kg) of acetylene carbon black to form a second batch of dry mixture. The second batch of dry mixture was combined with the first batch of dry mixture.

One hundred and eighty pounds (82 Kg) of the dry mixture was ball milled and then loaded into a ribbon blender rotating at about forty-five revolutions per minute. Fourteen pounds (6.4 Kg) of Hubinger 670 grade powdered starch and four pounds (1.8 Kg) of Ogilvie Mills, Inc. Gen Vis (R) 700 pregelatinized wheat starch was added to the mixture over a period of about ten minutes. Eleven gallons (42 liters) of water were then added to the starch and milled dry mixture over a period of about thirty minutes to form a wet mixture suitable for extrusion.

The wet mixture was extruded with a four inch (10.2 cm) single screw extruder through 0.25 inch (0.64 cm) holes in a stainless steel die plate. A knife blade was passed across the holes periodically as the wet mixture was extruded. The extruded wet mixture was thereby severed to form wet precursor pellets in the shape of right cylinders having a diameter and a length of about 0.25 inches (0.64 cm). The wet precursor pellets were oven dried to form dry precursor pellets in a forced-air convection oven at a temperature of 150° C. for a period of time of about nine hours to reduce water content of the pellets to below about two percent by weight of the pellets.

The dried precursor pellets were loaded into a continuous, carbothermal reactor, such as is described in U.S. Pat. No. 4,983,553, the teachings of which are incorporated herein by reference. The dried pellets were loaded into solid bottom trays of the carbothermal reactor to a depth of about 0.25 inches (0.64 cm). The trays were then pushed through the furnace at a push rate sufficient to allow a ninety minute reaction time at a maximum temperature of 1750° C. A countercurrent nitrogen flow of about 1,600 cubic feet (45.3 cubic meters) per hour was directed through the furnace while the trays were contained therein.

The aluminum nitride pellets were then loaded into a continuous six inch diameter rotary kiln and exposed to a temperature of about 750° C. for a period of time about 1.5 hours in an air atmosphere to remove excess carbon in the aluminum nitride pellets, and then removed from the reactor. The aluminum nitride pellets were then loaded to a depth of about 0.5 inches (1.27 cm) onto a nine inch (23 cm) diameter eight mesh screen and vibrated by manually vibrating the screen vigorously for a period of time of about thirty seconds. Fines removed from the pellets and which passed through the screens were collected. About 21.2% of the weight of the aluminum nitride pellets broke away from the aluminum nitride pellets during screening to form fines.

The fines and the aluminum nitride pellets were analyzed to determine parts per million present of calcium, silicon, chromium and iron by X-ray fluorescence. The results are listed below in Table 1. As can be seen from Table 1, calcium, silicon, iron and chromium are more concentrated in the fines collected from screening than in the aluminum nitride pellets formed by carbothermal reaction.

TABLE 1

| Sample | Parts per Million | | | |
|---|---|---|---|---|
| | Ca | Si | Fe | Cr |
| Fine #1 | 1347 | 129 | 57 | 7 |
| Fine #2 | 1339 | 156 | 69 | 7 |
| Fine #3 | 1268 | 139 | 78 | 7 |
| Fines Avg. | 1318 | 141 | 68 | 7 |
| Pellets #1 | 1069 | 127 | 50 | 5 |
| Pellets #2 | 1069 | 117 | 50 | 5 |
| Pellets #3 | 1082 | 115 | 40 | 5 |
| Pellets Avg. | 1073 | 120 | 47 | 5 |

EXAMPLE II

Precursor pellets were formed and exposed to conditions sufficient to form aluminum nitride pellets by carbothermal reaction as described in Example I. Thirty-five pounds (16 Kg) of the aluminum nitride pellets were collected from the furnace and a representative sample was taken from these pellets prior to screening. This sample was analyzed for trace metals using X-ray fluorescence.

The remainder of the thirty-five pounds (16 Kg) of aluminum nitride pellets were then fed to a sixteen inch (40.6 cm) seven mesh screen, constructed of 316L stainless steel, which was mounted in a vibratory screener commercially available from Sweco, Inc. The aluminum nitride pellets were fed to the screen at a rate of about sixty pounds (27.2 Kg) per hour. The frequency of vibration of the screen was about 1100 vibrations/minute. Fines removed from the pellets and which passed through the screens were collected. 1.1 pounds (0.5 Kg), or about three weight percent of the total weight of the aluminum nitride pellets broke away during screening to form fines. The fines and the aluminum nitride pellets were analyzed in the same manner as the samples taken from the pellets before screening to determine the amounts present of Ca, Si, Cr and Fe. The results are summarized below in Table 2. As can be seen from Table 2, Ca, Si, Cr and Fe are more concentrated in the fines collected from screening than in the aluminum nitride pellets formed by carbothermal reaction.

TABLE 2

| Sample | Parts per Million | | | |
|---|---|---|---|---|
| | Ca | Si | Fe | Cr |
| Pellets before screening | 143 | 154 | 46 | 5* |
| Pellets after screening | 138 | 136 | 37 | 5* |
| Fines | 196 | 191 | 770 | 108 |

*less than 5 ppm detection limit

EQUIVALENTS

Those skilled in the art will recognize or be able to ascertain using no more than routine experimentation, many equivalents to the specific embodiments of the invention described specifically herein. Such equivalents are intended to be encompassed in the scope of the following claims.

We claim:

1. A method of purifying carbothermally produced aluminum nitride, comprising the steps of:
   a) exposing precursor pellets, comprising aluminum oxide and carbon, to nitrogen under conditions sufficient to carbothermally produce aluminum nitride pellets having surface portions relatively rich in thermal conductivity-lowering and color-causing impurities compared to core portions of said aluminum nitride pellets; and
   b) removing significant amounts of said surface portions to thereby significantly increase the purity of the aluminum nitride contained in the aluminum nitride pellets.

2. A method of claim 1 wherein conditions sufficient to produce said aluminum nitride pellets include exposing said precursor pellets to an elevated temperature in the range of between about 1500° C. and about 1900° C. for a period of time in the range of between about 0.25 hours and about six hours.

3. A method of claim 2 wherein said surface portions of the aluminum nitride pellets are removed by attrition to thereby form fines.

4. A method of claim 3 wherein attrition is achieved by mechanical agitation of said aluminum nitride pellets on a screen through which the fines pass.

5. A method of claim 3 wherein the attrition is achieved by mechanical abrasion between the aluminum nitride pellets.

6. A method of carbothermally producing aluminum nitride, comprising the steps of:
   a) forming precursor pellets, comprising aluminum oxide and carbon;
   b) exposing said precursor pellets to nitrogen under conditions sufficient to carbothermally produce aluminum nitride pellets having surface portions relatively rich in thermal conductivity-lowering and color-causing impurities compared to core portions of said aluminum nitride pellets; and
   c) removing significant amounts of said surface portions to significantly increase the purity of the aluminum nitride contained in the aluminum nitride pellets.

7. In a carbothermal method for producing aluminum nitride by exposing aluminum oxide in the presence of carbon to nitrogen under conditions sufficient to produce aluminum nitride:

The improvement comprising exposing precursor pellets, comprising aluminum oxide and carbon, to nitrogen under conditions sufficient to carbothermally produce aluminum nitride pellets having surface portions relatively rich in thermal conductivity-lowering and color-causing impurities compared to core portions of said aluminum nitride pellets, and thereafter removing significant amounts of said surface portions to significantly increase the purity of the aluminum nitride contained in the aluminum nitride pellets.

* * * * *

UNITED STATES PATENT AND TRADEMARK OFFICE
CERTIFICATE OF CORRECTION

PATENT NO. : 5,100,846

DATED : March 31, 1992

INVENTOR(S) : David A. Dunn, et al.

It is certified that error appears in the above-identified patent and that said Letters Patent is hereby corrected as shown below:

ON THE TITLE PAGE

Under References Cited, U.S. Patent Documents, the thirteenth item, "4,877,259", should correctly read --4,877,759--.

Signed and Sealed this

Twentieth Day of July, 1993

Attest:

MICHAEL K. KIRK

*Attesting Officer*   Acting Commissioner of Patents and Trademarks